(12) United States Patent
Mollenkopf et al.

(10) Patent No.: US 7,259,657 B2
(45) Date of Patent: Aug. 21, 2007

(54) MULTI-SUBNET POWER LINE COMMUNICATIONS SYSTEM AND METHOD

(75) Inventors: James Douglas Mollenkopf, Fairfax, VA (US); David Stanley Yaney, Poolesville, MD (US)

(73) Assignee: Current Technologies, LLC, Germantown, MD (US)

( * ) Notice: Subject to any disclaimer, the term of this patent is extended or adjusted under 35 U.S.C. 154(b) by 225 days.

(21) Appl. No.: 11/156,608

(22) Filed: Jun. 21, 2005

(65) Prior Publication Data
US 2007/0008074 A1    Jan. 11, 2007

(51) Int. Cl.
*G05B 11/01*    (2006.01)

(52) U.S. Cl. .................... 340/310.11; 340/310.16; 375/220

(58) Field of Classification Search ........... 340/310.11, 340/310.16; 375/219, 220, 222; 370/351, 370/389, 400
See application file for complete search history.

(56) References Cited

U.S. PATENT DOCUMENTS 3,702,460 A    11/1972  Blose
3,810,096 A    5/1974   Kabat et al.
3,846,638 A    11/1974  Wetherell (Continued)

FOREIGN PATENT DOCUMENTS

DE    197 28 270 A1    1/1999

(Continued)

OTHER PUBLICATIONS

"EMETCON Automated Distribution System: Communications Guide", *Westinghouse ABB Power T & D Company Technical Manual 42-6001A*,. (Sep. 1989), 1-55.

(Continued)

*Primary Examiner*—Thomas Mullen
(74) *Attorney, Agent, or Firm*—Mel Barnes; Capital Legal Group, LLC

(57) ABSTRACT

A system that includes low voltage power line subnet coupler that provides bi-directional communications between multiple power line subnets while substantially preventing the flow of power is provided. The system may include a power line communications device coupled to a first LV power line subnet, and a low voltage power line subnet coupler providing a data communications path between the first low voltage power line subnet and a second low voltage power line subnet. Additionally, some embodiments include a low voltage repeater communicatively coupled to the second LV power line subnet.

23 Claims, 6 Drawing Sheets

U.S. PATENT DOCUMENTS

| | | | |
|---|---|---|---|
| 3,911,415 A | 10/1975 | Whyte | |
| 3,942,168 A | 3/1976 | Whyte | |
| 3,942,170 A | 3/1976 | Whyte | |
| 3,944,723 A | 3/1976 | Fong | |
| 3,967,264 A | 6/1976 | Whyte et al. | |
| 3,973,087 A | 8/1976 | Fong | |
| 3,973,240 A | 8/1976 | Fong | |
| 4,004,110 A | 1/1977 | Whyte | |
| 4,012,733 A | 3/1977 | Whyte | |
| 4,016,429 A | 4/1977 | Vercellotti et al. | |
| 4,057,793 A | 11/1977 | Johnson et al. | |
| 4,060,735 A | 11/1977 | Pascucci et al. | |
| 4,250,489 A | 2/1981 | Dudash et al. | |
| 4,433,284 A | 2/1984 | Perkins | |
| 4,473,816 A | 9/1984 | Perkins | |
| 4,473,817 A | 9/1984 | Perkins | |
| 4,475,209 A | 10/1984 | Udren | |
| 4,569,045 A | 2/1986 | Schieble et al. | |
| 4,599,598 A | 7/1986 | Komoda et al. | |
| 4,638,298 A | 1/1987 | Spiro | |
| 4,642,607 A | 2/1987 | Strom et al. | |
| 4,675,648 A | 6/1987 | Roth et al. | |
| 4,686,382 A | 8/1987 | Shuey | |
| 4,912,553 A | 3/1990 | Pal et al. | |
| 5,726,980 A | 3/1998 | Rickard | |
| 5,818,821 A | 10/1998 | Schurig | |
| 5,870,016 A | 2/1999 | Shresthe | |
| 5,929,750 A | 7/1999 | Brown | |
| 5,933,071 A | 8/1999 | Brown | |
| 5,949,327 A | 9/1999 | Brown | |
| 5,977,650 A | 11/1999 | Rickard et al. | |
| 5,978,371 A | 11/1999 | Mason, Jr. et al. | |
| 5,982,276 A | 11/1999 | Stewart | |
| 6,037,678 A | 3/2000 | Rickard | |
| 6,278,357 B1 | 8/2001 | Croushore et al. | |
| 6,282,405 B1 | 8/2001 | Brown | |
| 6,317,031 B1 | 11/2001 | Rickard | |
| 6,346,875 B1 | 2/2002 | Puckette et al. | |
| 6,373,377 B1 | 4/2002 | Sacca et al. | |
| 6,407,987 B1 * | 6/2002 | Abraham | 340/310.17 |
| 6,496,104 B2 | 12/2002 | Kline | |
| 6,624,532 B1 | 9/2003 | Davidow | |
| 6,687,574 B2 | 2/2004 | Pietrowicz et al. | |
| 6,885,674 B2 | 4/2005 | Hunt et al. | |
| 6,933,835 B2 | 8/2005 | Kline | |
| 6,950,567 B2 | 9/2005 | Kline | |
| 6,958,680 B2 | 10/2005 | Kline | |
| 6,965,302 B2 | 11/2005 | Mollenkopf et al. | |
| 6,965,303 B2 | 11/2005 | Mollenkopf | |
| 6,977,578 B2 | 12/2005 | Kline | |
| 6,980,090 B2 | 12/2005 | Mollenkopf | |
| 6,980,091 B2 | 12/2005 | White et al. | |
| 6,933,317 B2 | 1/2006 | Belsak, Jr. | |
| 6,998,962 B2 | 2/2006 | Cope et al. | |
| 7,046,882 B2 | 5/2006 | Kline | |
| 7,075,414 B2 | 7/2006 | Giannini et al. | |
| 7,142,094 B1 | 11/2006 | Davidow et al. | |
| 2001/0054953 A1 | 12/2001 | Kline | |
| 2002/0002040 A1 | 1/2002 | Kline et al. | |
| 2002/0097953 A1 | 7/2002 | Kline | |
| 2002/0109585 A1 | 8/2002 | Sanderson | |
| 2002/0110310 A1 | 8/2002 | Kline | |
| 2002/0110311 A1 | 8/2002 | Kline | |
| 2002/0118101 A1 | 8/2002 | Kline | |
| 2002/0121963 A1 | 9/2002 | Kline | |
| 2002/0154000 A1 | 10/2002 | Kline | |
| 2003/0039257 A1 | 2/2003 | Manis | |
| 2003/0103307 A1 | 6/2003 | Dostert | |
| 2003/0169155 A1 | 9/2003 | Mollenkopf et al. | |
| 2003/0224784 A1 | 12/2003 | Hunt et al. | |
| 2004/0032320 A1 | 2/2004 | Zalitzky et al. | |
| 2004/0054425 A1 | 3/2004 | Elmore | |
| 2004/0067745 A1 | 4/2004 | Belsak | |
| 2004/0075535 A1 | 4/2004 | Propp | |
| 2004/0110483 A1 | 6/2004 | Mollenkopf | |
| 2004/0113756 A1 | 6/2004 | Mollenkopf | |
| 2004/0113757 A1 | 6/2004 | White, II et al. | |
| 2004/0135676 A1 | 7/2004 | Berkman et al. | |
| 2004/0157551 A1 | 8/2004 | Gainey et al. | |
| 2004/0163128 A1 | 8/2004 | Phillips et al. | |
| 2004/0168199 A1 | 8/2004 | Phillips et al. | |
| 2004/0223617 A1 | 11/2004 | Corcoran et al. | |
| 2004/0227621 A1 | 11/2004 | Cope et al. | |
| 2004/0227622 A1 | 11/2004 | Giannini et al. | |
| 2004/0242185 A1 | 12/2004 | Lee | |
| 2004/0257731 A1 | 12/2004 | Legaud | |
| 2005/0017825 A1 | 1/2005 | Hansen | |
| 2005/0040809 A1 | 2/2005 | Uber, III et al. | |
| 2005/0046550 A1 | 3/2005 | Crenshaw et al. | |
| 2005/0068223 A1 | 3/2005 | Vavik | |
| 2005/0076148 A1 | 4/2005 | Chan et al. | |
| 2005/0111533 A1 | 5/2005 | Berkman | |
| 2005/0164666 A1 | 7/2005 | Lang et al. | |
| 2005/0168326 A1 | 8/2005 | White et al. | |
| 2005/0194838 A1 | 9/2005 | Wetmore | |
| 2005/0200459 A1 | 9/2005 | White, II | |
| 2005/0220004 A1 | 10/2005 | Vollmer et al. | |
| 2005/0238107 A1 | 10/2005 | Yamashita et al. | |
| 2005/0249245 A1 | 11/2005 | Hazani et al. | |
| 2005/0258920 A1 | 11/2005 | Elmore | |
| 2005/0285720 A1 | 12/2005 | Cope et al. | |
| 2006/0045105 A1 | 3/2006 | Dobosz et al. | |
| 2006/0073805 A1 | 4/2006 | Zumkeller et al. | |
| 2006/0097573 A1 | 5/2006 | Gidge et al. | |
| 2006/0165054 A1 | 7/2006 | Iwamura | |
| 2006/0044076 A1 | 9/2006 | Law | |
| 2006/0221995 A1 | 10/2006 | Berkman | |
| 2006/0262881 A1 | 11/2006 | Cern | |
| 2007/0001821 A1 | 1/2007 | Berkman | |
| 2007/0002771 A1 | 1/2007 | Berkman et al. | |
| 2007/0002876 A1 | 1/2007 | Berkman et al. | |

FOREIGN PATENT DOCUMENTS

| | | |
|---|---|---|
| DE | 101 47 918 A1 | 4/2003 |
| EP | 0 933 883 A2 | 8/1999 |
| EP | 0 933 883 A3 | 8/1999 |
| EP | 1 075 091 A1 | 2/2001 |
| EP | 1 217 760 A1 | 6/2002 |
| EP | 1 251 646 A2 | 10/2002 |
| GB | 2 293 950 A | 4/1996 |
| GB | 2 342 264 A | 4/2000 |
| JP | 1276933 | 11/1989 |
| JP | 10200544 | 7/1998 |
| WO | WO-92/16920 A1 | 10/1992 |
| WO | WO-01/08321 A1 | 2/2001 |
| WO | WO-03/30396 A2 | 4/2003 |
| WO | WO-2004/008656 A1 | 1/2004 |
| WO | WO 04102868 | 11/2004 |

OTHER PUBLICATIONS

"IEEE Guide for Power-Line Carrier Applications, ANSI/IEEE Std 643-1980", *The Institute of Electrical and Electronics Engineers, Inc.*, (1980), 1-80.

"Outlook Conference 2007: Amperion Deployment Overview", *Primen Conference*, (May 7, 2007), 1-10.

"PLC, A New Competitor in Broadband Internet Access", *Power Line Communications Conference*, (Dec. 12, 2001), 1-60.

"Power Line Communications", *Power Line Communications*, www.plexeon.com/power.html, (1998), 1-2.

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992), 1-11.

"Summary of an IEEE Guide for Power-Line Carrier Applications", *IEEE Transactions on Power Apparatus and Systems*, (Nov./Dec. 1980),2334-2337.

Amirshahi, P., et al., "Transmission Channel Model and Capacity of Overhead Multi-conductor Medium-Voltage Power-lines for Broadband Communications", *Pennsylvania State University*, (Jan. 3, 2005).

Feduschak, N A., "Waiting in the Wings: Is Powerline Technology Ready to Compete with Cable?", www.cabletoday.com/ic2/archives/0301/0301powerline.htm, (Mar. 2001), 1-5.

Hasler, E F., et al., "Communication Systems Using Bundle Conductor Overhead Power Lines", *IEEE Transactions on Power Apparatus and Systems*, (Mar./Apr. 1975),344-349.

Horiguchi, Akira, "High Speed Power Line Communication Technology", *Mitsubishi Electric Advance* vol. 109, (Mar. 2005), 1-27.

Meng, H, et al., "A Transmission Line Model for High-Frequency Power Line Communication Channel", *IEEE*, (2002), 1290-1295.

Naredo, J L., et al., "Design of Power Line Carrier Systems on Multitransposed Delta Transmission Lines", *IEEE Transactions on Power Delivery*, (1991),952-958.

\* cited by examiner

MULTI-SUBNET POWER LINE COMMUNICATIONS SYSTEM AND METHOD

FIELD OF THE INVENTION

The present invention generally relates to data communications over a power distribution system and more particularly, to a multi-subnet power line communications system and method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices, can be used to carry data signals to and from the homes and offices. These data signals are communicated on and off the power lines at various points in the power line communication system, such as, for example, near homes, offices, Internet service providers, and the like.

Power system transformers are one obstacle to using power distribution lines for data communication. Transformers act as a low-pass filter, passing the low frequency (e.g., the 50 or 60 Hz) power signals and impeding the high frequency signals (e.g., frequencies typically used for data communication). As such, power line communication systems face the challenge of communicating the data signals around, or through, the distribution transformers. In the past, power line communications systems typically have installed a bypass device at each transformer. However, such installations can be expensive and time consuming.

Thus, there is a need for a power line communications system that does not require installing a network element at each utility pole or at each distribution transformer, that can ensure the safety of the power distribution system, and provide reliable communications. These and other advantages may be provided by various embodiments of the present invention.

SUMMARY OF THE INVENTION

The present invention provides a system that includes low voltage power line subnet coupler that provides bi-directional communications between multiple power line subnets while substantially preventing the flow of the power signal. The system may include a power line communications device coupled to a first LV power line subnet, and a low voltage power line subnet coupler providing a data communications path between the first low voltage power line subnet and a second low voltage power line subnet. Additionally, some embodiments of the system may include a low voltage repeater communicatively coupled to the second LV power line subnet.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, PLCS, terminals, devices, components, techniques, data and network protocols, software products and systems, operating systems, development interfaces, and hardware are omitted so as not to obscure the description of the present invention.

Figure 1:
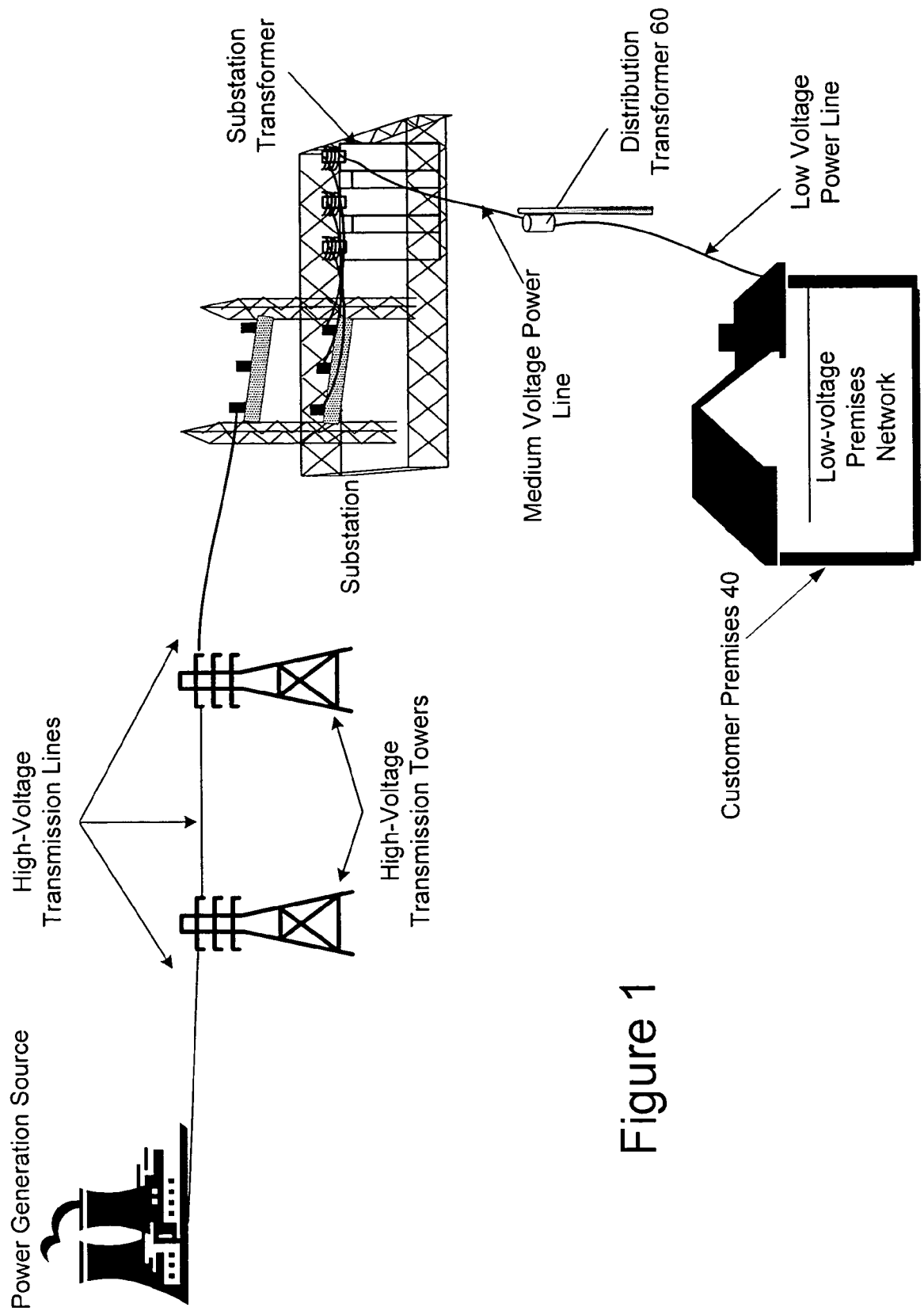
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 800 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or as step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase voltages to the customer premises, depending upon the demands of the user.

In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

Power Line Communication System

Figure 2:
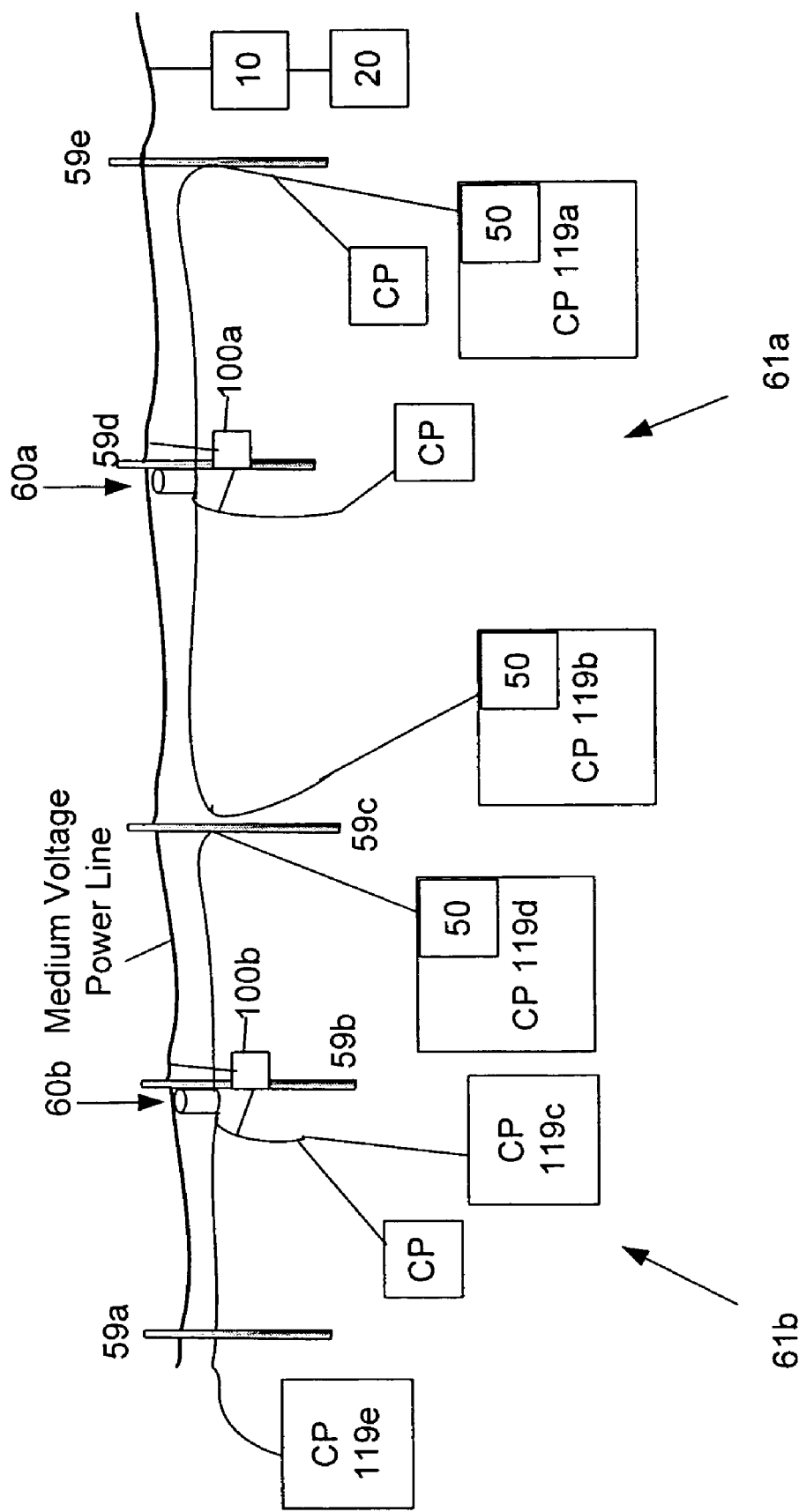
FIG. 2 is a diagram of a portion of a conventional power line communications system.

One example of a portion of a conventional PLCS is shown in FIG. 2. In this example, two bypass devices (BD) 100a and 100b are used to communicate data signals around the distribution transformers that would otherwise filter such data signals, preventing them from passing through the transformer or significantly degrading them. Thus, the BD 100 is the gateway between the LV power line subnet (i.e., the LV power line connected to the distribution transformer and the devices that are communicatively coupled to the LV power lines) and the MV power line and communicates signals to and from user devices at the customer premises (CP) via the low voltage subnet 61.

In this embodiment, the BD 100 provides communication services for the user, which may include security management, routing of Internet Protocol (IP) packets, filtering data, access control, service level monitoring, signal processing and modulation/demodulation of signals transmitted over the power lines.

This example portion of a PLCS also includes a backhaul point 10. The backhaul point 10 is an interface and gateway between a portion of a PLCS (e.g., an MV run) and a traditional non-power line telecommunications network. One or more backhaul points (BP) 10 are communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, BDs 100, (e.g., the LV modems and MV modems of BDs), BPs 10, and AP 20) IP addresses and storing the IP addresses and other device identifying information (e.g., the device's location, address, serial number, etc.) in its memory. In addition, the PLS may approve or deny user devices authorization requests, command status reports, statistics and measurements from the BDs, and BPs, and provide application software upgrades to the communication devices (e.g., BDs, BPs, and other devices). The PLS, by collecting electric power distribution information and interfacing with utilities' back-end computer systems may provide enhanced power distribution services such as automated meter reading, outage detection, restoration detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, user devices, and BPs through the respective AP and/or core router.

The PLCS may further include indoor low voltage repeaters and outdoor low voltage repeaters. Indoor low voltage repeaters may be plugged into a wall socket inside the customer premises. Outdoor low voltage repeaters may be coupled to the external low voltage power line conductors extending from the transformer and therefore, be located between the customer premises and the BD 100. Both the indoor low voltage repeaters and outdoor low voltage repeaters repeat data on the low voltage power line to extend the communication range of the BD 100 and power line modem.

At the user end of the PLCS of this example system, data flow originates from a user device, which provides the data to a power line modem (PLM) 50, which is well-known in the art.

The user device connected to the PLM 50 may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device (which may be a digital video recorder), a home network device, a utility meter, or other device. The PLM 50 transmits the data received from the user device through the LV power lines to a BD 100 and provides data received from the LV power line to the user device. The PLM 50 may also be integrated with the user device, which may be a computer. In addition, the functions of the PLM may be integrated into a smart utility meter such as a gas meter, electric meter, water meter, or other utility meter to thereby provide automated meter reading (AMR).

The BD 100 typically receives data from the user devices coupled to its LV power line subnet and then transmits the data to (and receives the data from) the backhaul point 10, which, in turn, transmits the data to (and receives the data from) the AP 20. The AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination. A more detailed description of an example PLCS is provided in U.S. patent application Ser. No. 10/641,689 filed Aug. 14, 2003, issued Dec. 27. 2005 as U.S. Pat. No. 6,980,091, entitled "Power Line Communication System and Method of Operating the Same," which is hereby incorporated by reference in its entirety. The present invention may be used with networks as described in the above patent application or others. Thus, the invention is not limited to a particular PLCS, PLCS architecture, or topology.

Referring to FIG. 2, this conventional PLCS includes a BD 100 at each of the distribution transformers 60a and 60b to service the user devices coupled to the respective LV power line subnet. Thus, BD 100a is coupled to backhaul point 10 via the MV power line and also coupled to LV power line subnet 61a to provide communications to the user devices coupled thereto. In this example, LV power line subnet 61a includes the LV power lines coupled to distribution transformer 60a, which may be connected to between one and ten (and sometimes more) customer premises CP. One or more of the customer premises may include one or more power line modems 50 and associated user devices that are connected to the internal power lines such as, for example, at CP 119a and 119b.

Similarly, BD 100b is coupled to backhaul point 10 via the MV power line and also coupled to LV power line subnet 61b to provide communications to the user devices coupled thereto. In this example, LV power line subnet 61b includes the LV power lines coupled to distribution transformer 60b. One or more of the customer premises receiving power via LV power line subnet 61b may include one or more PLMs 50 and the associated user devices connected thereto such as, for example, at CP 119c, 119d, and 119e. As will be evident to those skilled in the art, the operator of this conventional PLCS system typically must install a BD 100 for each LV power line subnet.

Figure 3:
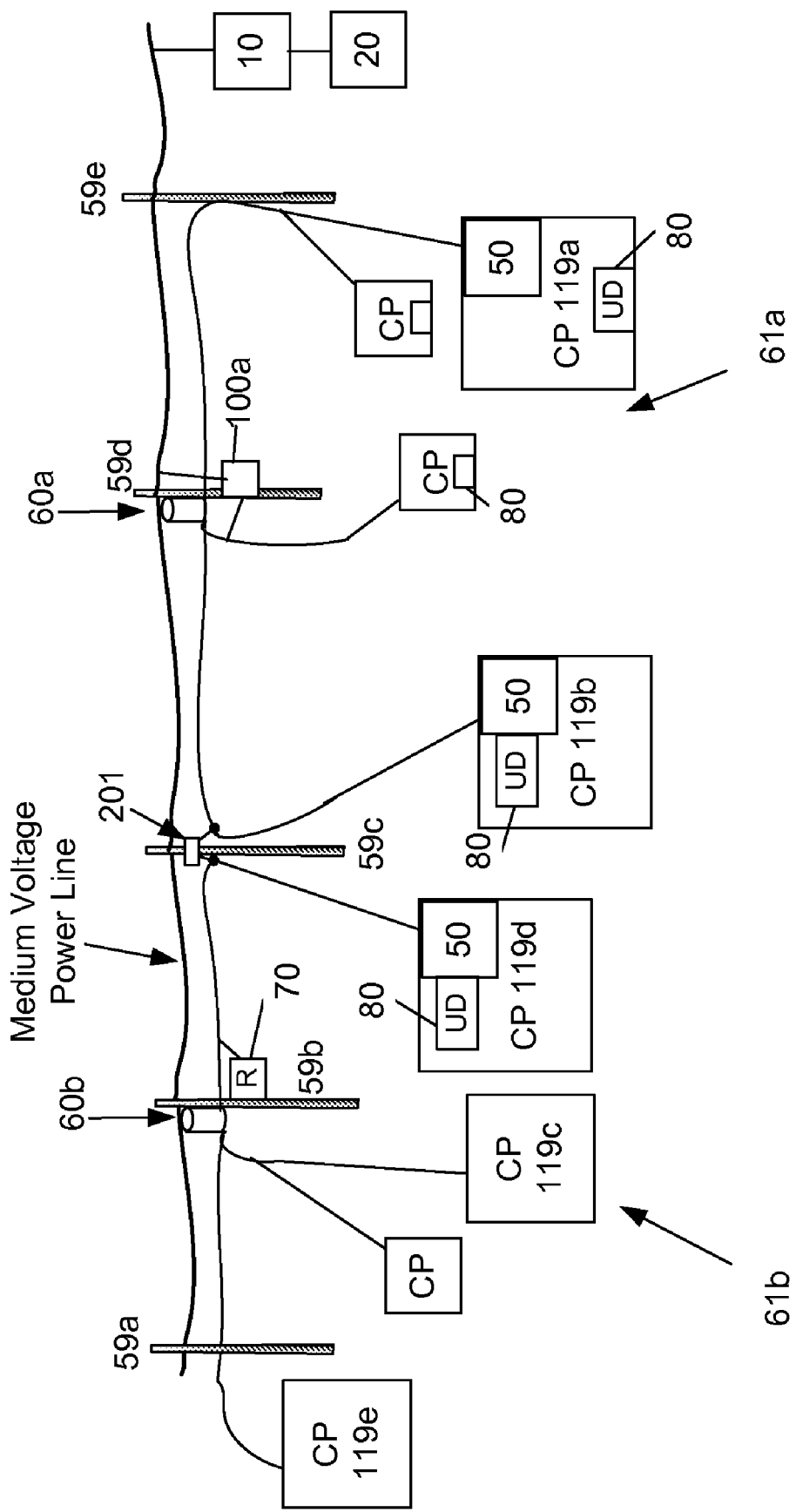
FIG. 3 is a diagram of an example embodiment of a power line communications system according to the present invention.

An example implementation of an embodiment of the present invention is shown in FIG. 3. In this example embodiment, BD 100a is coupled to backhaul point 10 via the MV power line and also coupled to LV power line subnet 61a to provide communications to the user devices 80 coupled thereto. However, instead of installing BD 100b at distribution transformer 60b, the present invention employs a LV power line subnet coupler 201 to bi-directionally couple data signals between LV power line subnets 61a and 61b. Thus, in this example embodiment, BD 100a may provide communications to CPs 119a-e and any of the other customer premises shown in FIG. 3.

In this example embodiment, LV power line subnet coupler 201 may include a fuse and high pass filter for each data path to permit the flow of data between the two LV power line subnets and to substantially prevent the flow of the power signals between the two LV power line subnets.

Figure 4:
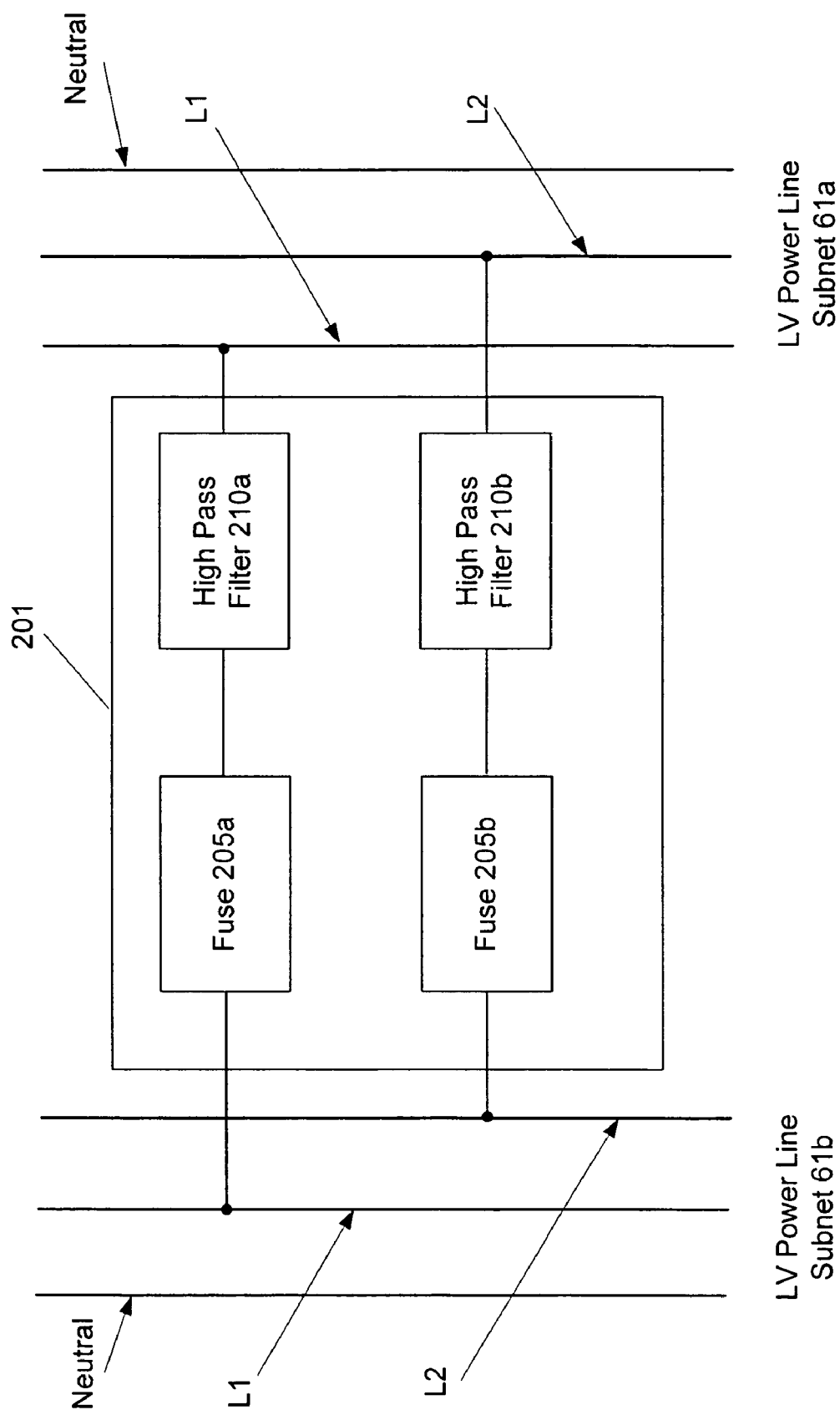
FIG. 4 is a schematic of an example low voltage power line coupler for use in an example embodiment of a system according to the present invention.

Often LV power lines include more than one energized power line conductor. FIG. 4 illustrates an example embodiment of a LV power line subnet coupler 201 for coupling data signals between two LV power line subnets 61a and 61b that each include a first energized conductor L1, a second energized conductor L2, and a neutral conductor. As shown in FIG. 4, the LV power line coupler 201 includes two data paths—a first data path between the first energized conductor L1 of LV power line subnet 61b and the first energized conductor L1 of LV power line subnet 61a and a second data path between the second energized conductor L2 of LV power line subnet 61b and the second energized conductor L2 of LV power line subnet 61a. Each path may include a fuse 205 and a high pass filter 210. The high pass filter 210 may comprise a band pass filter or any other filter that permits passage of the carrier frequencies used to communicate the data signals while also preventing the power signals from being conducted along the data path between the two power line subnets. In one embodiment, the high pass filter 210 may comprise a capacitor selected to permit the flow of data signals between the LV power line subnets that also prevents the power signals from being conducted between the two power line subnets. The fuses 205 are included to disconnect the two LV power line conductors in the event that the current through the data path is greater than expected for the data signals, which could happen in the event of a fault that would otherwise overload the high pass filter 210 and create a short between the two LV power lines. While this embodiment does not couple the neutral conductors of the two LV power line subnets together, other embodiments may include another data path to couple the neutral conductors together.

While the system of FIG. 3 includes a single BD 100a providing communications to a second LV power line subnet 61b via one LV power line subnet coupler 201, other systems may include two or more LV power line subnet couplers 201 that couple a BD 100 to two or more additional LV power line subnets. Thus, from a broader perspective, the system may include a backhaul point 10 communicatively coupled to a plurality of BDs 100 (such as, for example, via an MV rower line) and wherein a plurality of the BDs 100 are coupled to two or more LV powerline subnets. Furthermore, in any of the embodiments of the present invention, the system may include an outdoor LV repeater 70 coupled to one or more of the subnets. For example, referring to FIG. 3, it may be desirable to install an outdoor LV repeater 70 at utility pole 59b and coupled to LV power line subnet 61b. Additionally, it may be desirable to install an indoor LV repeater in any of the customer premises shown in FIG. 3.

Figure 5:
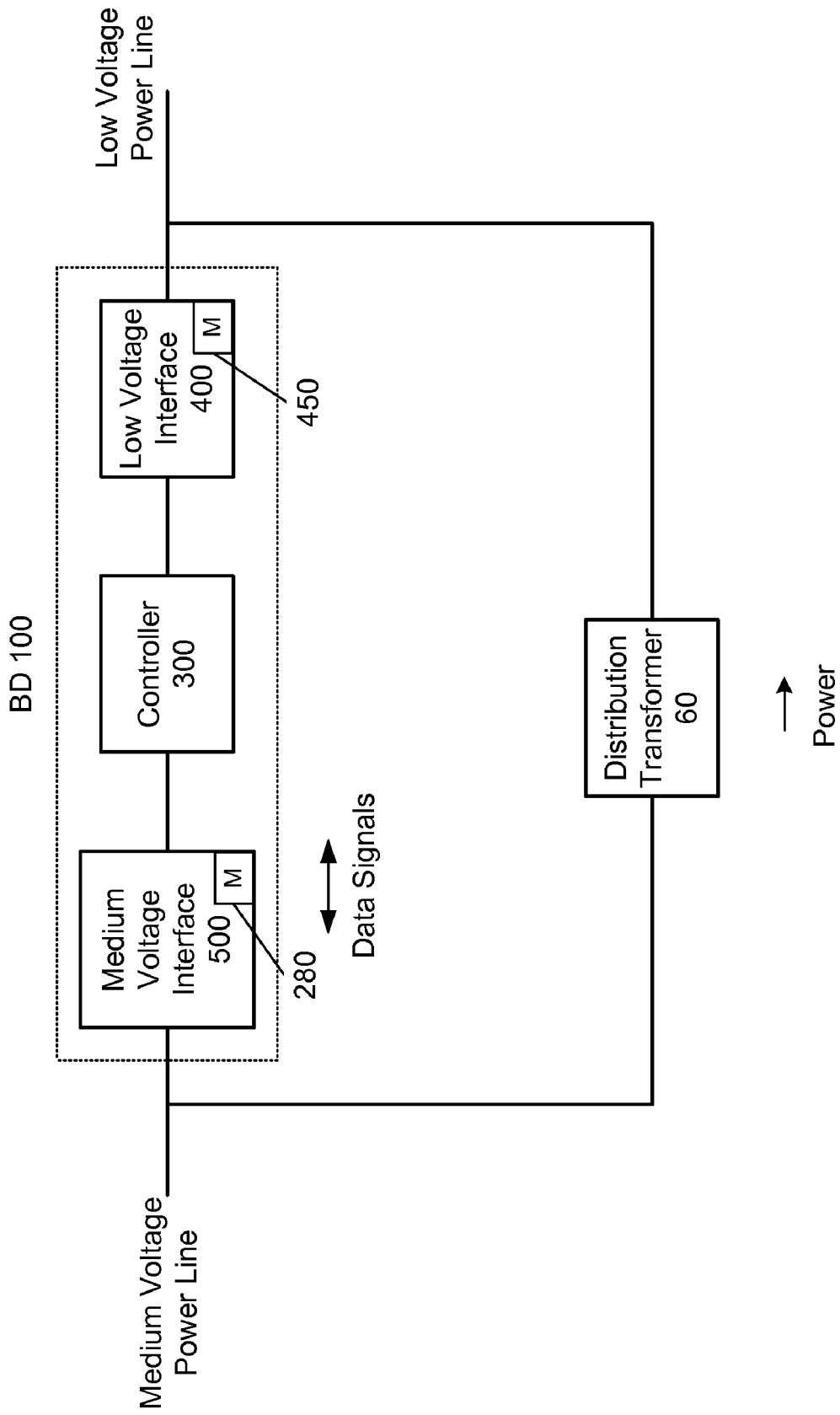
FIG. 5 is a block diagram of a bypass device, in accordance with an embodiment of the present invention.

The BD 100 described herein, which is an example embodiment of the present invention, provides bi-directional communications and includes the functional block diagram shown in FIG. 5. In particular, this embodiment of the BD 100 includes a MV power line interface (MVI) 500 with modem 280, a controller 300, and a LV power line interface (LVI) 400 with modem 450. Both the MVI 500 and LVI 400 may include an adaptive and/or dynamic transmitter to transmit signals at various power levels as determined by the controller 300, which may change the output power in response to a command from the PLS or automatically due to changes in line impedance. The BD 100 is controlled by a programmable processor and associated peripheral circuitry, which form part of the controller 300. The controller 300 includes memory that stores, among other things, routing information and program code, which controls the operation of the processor.

In one embodiment, the BDs 100 transmit the data signals differentially onto the two LV energized conductors so that the data signals on the two energized conductors are substantially equal in magnitude and opposite in polarity. A detailed description of differentially transmitting data signals over multiple energized conductors and associated circuitry is provided in the incorporated reference."

Figure 6:
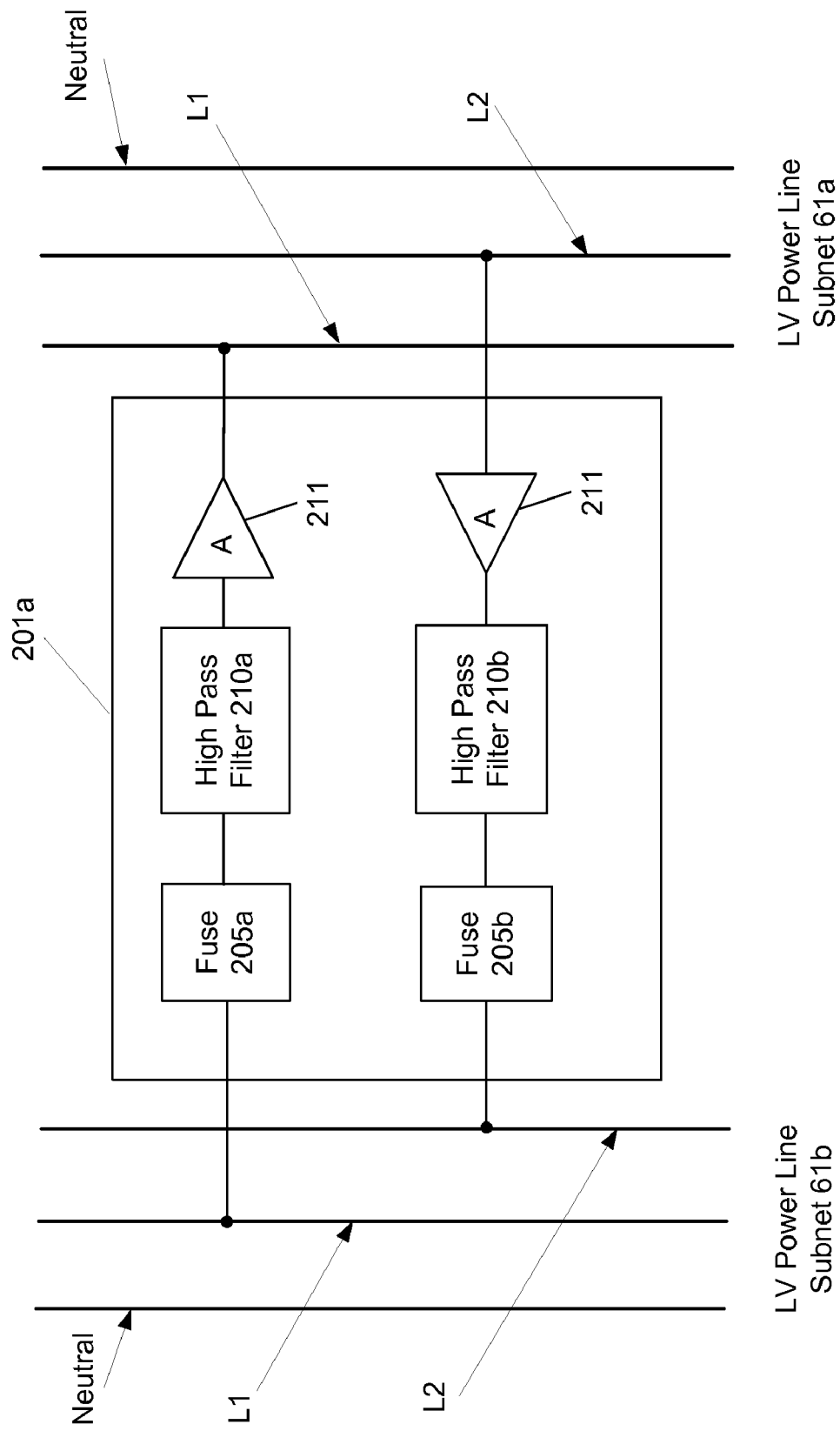
FIG. 6 is a schematic of another example low voltage power line coupler for use in an example embodiment of a system according to the present invention.

In the above example embodiment, the two LV power line subnets traverse near the same utility pole. In other instances, the two LV power lines may be one, two or more poles apart and the LV power line coupler 201 may include a length of conductors for connecting the two subnets. For example, in addition to the components listed above, the LV power line subnet coupler may include a length of coaxial cable and a balun (e.g., for providing impedance matching) to connect two LV power line subnets that are distal from each other. Also, while the LV power line coupler 201 of the above example is a passive device, in another embodiment a LV rower line subnet coupler 201a (see FIG. 6) may further include an amplifier 211 to amplify signals in one or both directions such as for example in a frequency division multiplexed system that includes a first frequency band for communications downstream and a second frequency band for communications upstream. Thus, the device 201a may include a filter 210 and amplifier 211 for each direction and frequency band of transmission (and for each set of conductors to be coupled together).

Finally, the type of data signals communicated via the MV and LV power lines be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used for one or both of the LV and MV power lines, including HomePlug 1.0 or AV data signals. A modulation scheme producing a wideband signal such as CDMA or OFDM that is relatively flat in the spectral domain may be used to reduce radiated interference to other systems while still delivering high data communication rates.

In addition, instead of using OFDM signals on the MV power line or LV power line, an alternate embodiment of a PLCS system may use ultra wideband signals to provide communications over the MV and/or LV power lines.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for providing power line communications over a power distribution system having a plurality of low voltage (LV) subnets that each supply power to a plurality of customer premises, comprising:
   a power line communications device having a first modem communicatively coupled to a first LV power line subnet to communicate data signals therethrough;
   a subnet coupler communicatively coupled to the first LV power line subnet and to a second LV power line subnet; and
   wherein said subnet coupler is configured to substantially prevent the flow of power between the first and second LV power line subnets and to couple data signals between the first and second LV power line subnets.

2. The system of claim 1, wherein said subnet coupler comprises a high pass filter.

3. The system of claim 1, wherein the first and second LV power line subnets each include a first and second energized conductor, and said modem is configured to differentially transmit the data signals on the first and second energized conductor of the first power line subnet.

4. The system of claim 3, wherein said subnet coupler is configured to couple the first energized conductor of the first LV power line subnet to the first energized conductor of the second LV power line subnet.

5. The system of claim 4, wherein said subnet coupler is configured to couple the second energized conductor of the first LV power line subnet to the second energized conductor of the second LV power line subnet.

6. The system of claim 3, wherein said subnet coupler comprises a first data path including a first high pass filter configured to couple the first energized conductor of the first LV power line subnet to the first energized conductor of the second LV power line subnet and further comprises a second data path including a second high pass filter configured to couple the second energized conductor of the first LV power line subnet to the second energized conductor of the second LV power line subnet.

7. The system of claim 6, wherein said first data path further comprises a first fuse communicatively coupled to said first high pass filter and said second data path further comprises a second fuse communicatively coupled to said second high pass filter.

8. The system of claim 1, wherein the power distribution system includes a medium voltage power line and said power line communications device further comprises a second modem in communication with said first modem and communicatively coupled to the medium voltage power line to communicate data signals therethrough.

9. The system of claim 1, wherein said power line communications device is configured to communicate with a first user device coupled to the first LV power line subnet and a second user device coupled to the second LV power line subnet.

10. The system of claim 1, further comprising a repeater coupled to the second LV power line subnet and configured to repeat the data signals.

11. The system of claim 1, wherein said subnet coupler further comprises an amplifier.

12. A method for providing power line communications over a power distribution system having a medium voltage power line and a first and second low voltage (LV) subnet that each supply power to a plurality of customer premises, comprising:
   receiving first data from the MV power line;
   transmitting the first data over the first LV power line subnet;
   coupling the first data from the first power line subnet to the second power line subnet; and
   receiving the first data at a user device coupled to the second LV power line subnet.

13. The method of claim 12, wherein said coupling includes communicating the first data through a high pass filter.

14. The method of claim 13, wherein said coupling further includes communicating the first data through a fuse.

15. The method of claim 12, wherein the first and second LV power line subnets include a first and second energized conductor, and said transmitting comprises differentially transmitting a data signal on the first and second energized conductors of the first LV power line subnet.

16. The method of claim 15, wherein said coupling comprises first coupling of the data signal from the first energized conductor of the first LV power line subnet to the first energized conductor of the second LV power line subnet and second coupling of the data signal from the second energized conductor of the first LV power line subnet to the second energized conductor of the second LV power line subnet.

17. The method of claim 16, wherein said first coupling includes communicating the data signal through a first high pass filter and said second coupling includes communicating the data signal through a second high pass filter.

18. The method of claim 17, wherein said first coupling further includes communicating the data signal through a first fuse and said second coupling further includes communicating the data signal through a second fuse.

19. The method of claim 12, further comprising:
   transmitting second data from a user device coupled to the second LV power line subnet; and
   coupling the second data from the second power line subnet to the first power line subnet.

20. The method of claim 19, further comprising receiving the second data from the first power line subnet.

21. The method of claim 20, further comprising transmitting the second data over the MV power line.

22. The method of claim 12, wherein the coupling further comprises amplifying a data signal representing the first data.

23. A device for communicating data signals between first and second low voltage (LV) subnets that each supply power to a plurality of customer premises, each low voltage subnet having a first energized conductor and a second energized conductor, the device comprising:

a first data path comprising a first high pass filter configured to be communicatively coupled to the first energized conductor of the first LV power line subnet and to the first energized conductor of the second LV power line subnet to couple data signals therebetween while substantially preventing the flow of power;

said first data path further comprising a first fuse communicatively coupled to said first high pass filter;

a second data path comprising a second high pass filter configured to be communicatively coupled to the second energized conductor of the first LV power line subnet and to the second energized conductor of the second LV power line subnet to couple data signals therebetween while substantially preventing the flow of power; and said second path further comprising a second fuse communicatively coupled to said second high pass filter.

* * * * *